Patented May 14, 1946

2,400,420

UNITED STATES PATENT OFFICE 2,400,420

GEOCHEMICAL PROSPECTING

Leo Horvitz, Houston, Tex.

No Drawing. Application July 20, 1942,
Serial No. 451,634

4 Claims. (Cl. 23—230)

The present invention relates to a process of geochemical prospecting.

More specifically, the present invention relates to geochemical prospecting for carbonaceous deposits, such as oil, gas, coal and the like, and for structures in which such deposits may occur by the quantitative detection of leakage from the deposits themselves and from the rocks in which they are contained. Such leakage results in a deposition in the soil of evidence of the leakage and such evidence may be detected and measured by analysis of the soil. This invention relates to the broad subject matter of application Serial No. 107,497, filed October 24, 1936, and entitled Geophysical prospecting method.

An object of the present invention is to provide a method of geochemical prospecting for buried structure capable of containing valuable deposits by the examination of surface and near surface soils for evidence therein of anomalous mineralization and secondary salt deposition.

Another object is to provide a rapid, low cost reconnaissance method of geochemical prospecting which may economically be employed to evaluate large areas relative to future exploration programs.

A more specific object of the present invention is to provide a method of geochemical prospecting by the analysis of soil samples collected at spaced intervals over an area to be explored for one or more of the class of alkaline-earth metals.

Usually, the halo phenomenon originally observed in connection with analyses for the content of the lighter hydrocarbons and described in a paper by E. E. Rosaire, entitled "Shallow stratigraphic prospecting over Gulf Coast structure," Geophysics, III, 2, March 1938, is also observable in the technique of the present invention.

Generally, it has been found that the consistency of results is better in samples of soil taken at a depth of several feet since topsoil samples are affected by leaching by meteoric waters, local fertilization, and the like. A compromise between the economy demanded by a reconnaissance method and the reasonable accuracy demanded by any exploration method indicates that a preferred form of the invention is practiced by the collection of samples from a depth of about ten feet, though, of course, the depth may be varied depending upon general conditions of climate, nature of soil, vegetation and agricultural utilization. It will be understood that all samples in a given area should preferably be collected at the same depth.

In actual practice the soil samples are collected at the same depth over a given area where this is possible. In some areas where there are outcroppings of rock or other natural impediments it often happens that the sampling depth selected cannot be continued throughout the whole area. For example, where samples are taken at eight feet at the start, it might develop later that in some certain spot it is only possible to penetrate six feet. In such cases it is preferred to take the majority of samples at the depth originally selected and take the remaining samples at as great a depth as they can be obtained. In any case, the depth at which each sample is taken is noted on the sample container for the information of the interpreter.

The practice is often followed of determining the variation with depth of the significant constituent in the sample holes at selected points along a profile. For example, in scattered holes in the area under investigation, samples are taken at one or two foot intervals in the sample hole so as to determine the variation of the significant constituent with depth. Then if all the deep samples over the area cannot be secured at the selected depth, say 12 feet, the depth determinations will aid the operator in deciding at what depth less than 12 feet he can safely take samples where they cannot be obtained at 12 feet.

Where there is already a producing well in an area under investigation it is advantageous to make depth determinations in each sample hole along a profile passing through the well. In this way the best depth at which to collect samples in the other profiles over the area in order to outline the field can be determined.

Where there is not excessive dipping of the formations it leads to uniformity to collect the samples out of the same formation so that the samples will have, as nearly as possible, the same general nature. Ordinarily strata near the surface have such a small dip that collection of the samples at a uniform depth will result in collection of the samples in the same stratum. Should it transpire that, where the samples are being analyzed for a constituent, such as calcium, and during the collection of the samples a deposit high in calcium, such as limestone, is encountered, the operator will naturally take this into account and the large increase in the calcium content in samples taken in this deposit will be taken into consideration in the interpretation of the results.

The constituent selected for determination will usually occur as a minor constituent of the soil sample, and may be present only in minute amounts. In some areas, however, the constituent selected as the significant constituent may constitute a very substantial portion of the soil sample. For example, in one area in which the samples were collected from caliche deposits and the variations in acid-soluble constituents, largely carbonates, were determined, an anomaly was obtained on the basis of the acid-soluble content which corresponded substantially with the anomaly prepared by analyses of samples for hydrocarbons. In many of these samples the acid-soluble components constituted more than 50% by weight of the sample. It is preferable to examine the samples for those constituents which are readily soluble in water or common inorganic acids.

Since most of the salts of the alkaline-earth metals commonly encountered in nature are water-insoluble, the conventional treatment of the samples will involve extraction thereof with a dilute acid capable of dissolving salts of alkaline-earth metals or, to put it in another way, acids which form water-soluble salts with alkaline-earth metals. The extract so obtained is then analyzed by well known methods for the alkaline-earth metal or metals relied upon as indicators. The alkaline-earth metal most commonly relied upon is calcium, but in areas where there are large outcroppings of limestone it may be preferable to examine the samples for an alkaline-earth metal which is not a predominant constituent thereof.

The usefulness of this method has been demonstrated in practice in that when exploration has been conducted in areas also explored by other methods, the method was found to give information similar to that obtained by other methods. It is not intended to imply that it gives substantially the same information in all cases as geochemical exploration by analysis of soil samples for, say, ethane. The patterns resulting from the method of the present invention thus far bear a similarity to those resulting from the hydrocarbon technique.

Naturally, the results of the method of the present invention leave something to the judgment of the interpreter. Should the interpreter find that a particular inorganic constituent runs low for a large number of samples and then suddenly increases to a high level, which is also maintained for a large number of samples, he will investigate to determine the nature of the formations from which the samples were procured. Likewise, when the interpreter finds a single high sample among a group of low samples, he will investigate the circumstances to determine what significance, if any, should be given to this single indication.

As in established geophysical practice, where, for example, gravitational and magnetic data are used to determine the economic feasibility of further work by seismic or other more expensive methods, the present invention offers an inexpensive technique useful in ascertaining the economic feasibility of further exploration of a given area. In this respect, it is in a position to be compared directly with the torsion balance, gravity meter, magnetometer, resistivity and electric-transient method which measure indirect evidence of the presence of structure, with the data yielding a basis for economic exploitation with more expensive methods, like the seismic which measures the structure directly, or a geochemical method which measures the direct leakage products for the sought deposits.

While the method of prospecting herein disclosed can be used as the basis for a drilling program, it appears to best advantage when used as a basis for additional prospecting before drilling. These economic factors are expressed in a paper by E. E. Rosaire entitled "Tactics and strategy of exploration for petroleum," III, Geophysics, IV, 3, July, 1939, pp. 155-166. Thus one species of the invention comprises prospecting over a region by the disclosed method, determining the areas which may economically be exploited by a prospecting method of higher resolving power, and further exploring the thus limited areas by such methods of higher resolving power.

The methods of higher resolving power include the seismic which under favorable conditions is capable of delineating structure favorable to the accumulation of oil and gas and the soil analysis method of application Serial No. 103,129, which is generally applicable to the problem of determining the existence and the real extent of such accumulations. The gravimetric, magnetometric, resistivity methods and the like do not fall in the class of methods of higher resolving power as they are generally conceded to be reconnaissance methods incapable of accurate and detailed structural analysis. Therefore, the term "method of higher resolving power," as used in this specification, is limited to the seismic method and the above mentioned soil analysis method with any improvement thereon.

As this invention is a surface method and contemplates surface methods of higher resolving power, prospecting with the drill, as by core drilling, is excluded from the definition of the term "method of higher resolving power."

This application is a continuation in part of my copending application Ser. No. 382,606, filed March 10, 1941, and entitled Geochemical prospecting, which in turn was a continuation in part of my application Ser. No. 304,141, filed November 13, 1939, and entitled Method of prospecting.

The nature and objects of the present invention having been thus described, what is claimed as new and useful and is desired to be secured by Letters Patent is:

1. A method of geochemical exploration for subterranean petroliferous deposits which comprises collecting samples of soil at spaced points in the area to be investigated at a depth several feet below the surface, said depth being sufficient to eliminate the effect of surface conditions, subjecting the individual samples to an analysis for the determination of the content thereof of a selected alkaline-earth metal and correlating the values determined with sample locations whereby the contents of the selected metal in the several samples may be compared for the purpose of identifying anomalously high concentrations thereof.

2. A method according to claim 1 in which the sample locations are laterally spaced from each other.

3. A method according to claim 1 in which the samples are collected at a depth of at least 10 feet.

4. A method according to claim 1 in which the sample locations are laterally spaced from each other and the samples are collected at a substantially uniform depth.

LEO HORVITZ.